US012364191B2

United States Patent
Oishi et al.

(10) Patent No.: US 12,364,191 B2
(45) Date of Patent: Jul. 22, 2025

(54) RECIPROCATING BLADES WITH SEALING MEMBER FOR MOTION CONVERSION MECHANISM

(71) Applicant: Makita Corporation, Anjo (JP)

(72) Inventors: Kohei Oishi, Anjo (JP); Tomoyuki Kutsuna, Anjo (JP); Takayoshi Iio, Anjo (JP)

(73) Assignee: MAKITA CORPORATION, Anjo (JP)

( * ) Notice: Subject to any disclaimer, the term of this patent is extended or adjusted under 35 U.S.C. 154(b) by 398 days.

(21) Appl. No.: 17/954,996

(22) Filed: Sep. 28, 2022

(65) Prior Publication Data

US 2023/0101418 A1      Mar. 30, 2023

(30) Foreign Application Priority Data

Sep. 29, 2021   (JP) ................................ 2021-159101

(51) Int. Cl.
*A01D 34/10*     (2006.01)
*A01D 34/40*     (2006.01)

(52) U.S. Cl.
CPC ............. *A01D 34/10* (2013.01); *A01D 34/40* (2013.01)

(58) Field of Classification Search
CPC ......... A01D 34/40; A01D 34/10; A01D 69/12
See application file for complete search history.

(56) References Cited

U.S. PATENT DOCUMENTS 1,191,147 A * 7/1916 Bjering ................ A01D 34/135
56/297
1,310,339 A * 11/1943 Holloman .............. A01D 34/18
56/309

(Continued)

FOREIGN PATENT DOCUMENTS

JP       S50129344 A    * 10/1975
JP       61-191728 U      11/1986

(Continued)

OTHER PUBLICATIONS

JPS50129344 (A)—English translation (Year: 1975).*
Japanese Office Action dated Dec. 17, 2024 in Application No. 2021-159101.

*Primary Examiner* — Joseph M Rocca
*Assistant Examiner* — Julia C Tran
(74) *Attorney, Agent, or Firm* — Sughrue Mion, PLLC (57) ABSTRACT

A working machine may include: a conversion mechanism configured to convert motion of a prime mover; a first blade connected to the conversion mechanism; a second blade overlapping with the first blade in an up-down direction and facing a first facing surface of the first blade; a sealing member engaged with a first non-facing surface of the first blade that is opposite to the first facing surface, wherein the sealing member includes a first sealing surface facing the first non-facing surface in the up-down direction; and a cover member facing a second sealing surface of the sealing member that is opposite to the first sealing surface of the sealing member. The sealing member may be disposed forward of the conversion mechanism and configured to suppress the object cut with the first blade and the second blade from moving toward the conversion mechanism between the first blade and the cover member.

5 Claims, 10 Drawing Sheets

(56) References Cited

U.S. PATENT DOCUMENTS

| | | | | |
|---|---|---|---|---|
| 2,335,541 | A | * | 11/1943 | Ronning ................ A01D 34/08 56/17.6 |
| 2,787,111 | A | * | 4/1957 | Templeton ........... A01D 34/135 56/297 |
| 2,882,596 | A | * | 4/1959 | Lee ........................ A01G 3/053 30/216 |
| 3,517,494 | A | * | 6/1970 | Beusink ............... A01D 34/404 56/293 |
| 4,860,526 | A | | 8/1989 | Hottes |
| 2008/0196376 | A1 | * | 8/2008 | Berti ...................... A01G 3/053 30/393 |
| 2014/0109540 | A1 | * | 4/2014 | Cook .................... A01D 34/30 56/320.1 |
| 2015/0163994 | A1 | * | 6/2015 | Bich ................... A01D 34/145 56/299 |
| 2022/0151159 | A1 | * | 5/2022 | Shimizu ................ A01G 3/053 |

FOREIGN PATENT DOCUMENTS

| | | |
|---|---|---|
| JP | 7-274649 A | 10/1995 |
| JP | 10-42645 A | 2/1998 |

* cited by examiner

RECIPROCATING BLADES WITH SEALING MEMBER FOR MOTION CONVERSION MECHANISM

CROSS-REFERENCE TO RELATED APPLICATION

This application claims priority to Japanese Patent Application No. 2021-159101, filed on Sep. 29, 2021, the entire contents of which are hereby incorporated by reference into the present application.

TECHNICAL FIELD

The disclosure herein relates to a working machine.

BACKGROUND

Japanese Patent Application Publication No. H7-274649 describes a blade unit. The blade unit includes a first blade, a second blade overlapping with the first blade in an up-down direction and facing a first facing surface of the first blade, a scraper engaged with the first facing surface of the first blade, and a guide member overlapping with the second blade in the up-down direction opposite to the first blade with respect to the second blade. The guide member has a dirt escape hole extending through the guide member in the up-down direction. When the first blade reciprocates in a first direction with respect to the second blade, the scraper also reciprocates in the first direction with respect to the second blade. When the semper reciprocates in the first direction with respect to the second blade, a foreign matter (e.g., dirt) between the first blade and the guide member is pushed by the scraper in a direction along the first direction and then discharged from between the first blade and the guide member through the dirt escape hole.

SUMMARY

In a case where a blade unit, such as the one above, is used in a working machine including a conversion mechanism (e.g., in a lawn clipper), the blade unit may be connected to, for example, a front portion of the conversion mechanism. When objects such as grass, lawn, etc. are cut with the first blade find the second blade, most of the cut objects are pushed by the scraper in the direction along the first direction due to reciprocation of the scraper. However, a part of the cut objects may cross over the scraper and reach the conversion mechanism. The disclosure herein provides a technology for suppressing cut objects from reaching a conversion mechanism.

A working machine disclosed herein may comprise a prime mover; a conversion mechanism configured to convert motion of the prime mover; a first blade connected to the conversion mechanism; a second blade overlapping with the first blade in an up-down direction and facing a first facing surface of the first blade; a sealing member engaged with a first non-facing surface of the first blade that is opposite to the first facing surface of the first blade, wherein the sealing member comprises a first sealing surface facing the first non-facing surface of the first blade in the up-down direction; and a cover member facing a second sealing surface of the sealing member that is opposite to the first sealing surface of the sealing member. The first blade may comprise a first blade edge. The second blade may comprise a second blade edge. The first blade may be configured to reciprocate along a first direction with respect to the second blade by the motion of the prime mover. The first blade edge of the first blade and the second blade edge of the second blade may be configured to cut an object when the working machine moves forward along a front-rear direction, which is perpendicular to the up-down direction, with the first blade reciprocating with respect to the second blade. The sealing member may be disposed forward of the conversion mechanism and configured to suppress the object cut with the first blade edge, of the first blade and the second blade edge of the second blade from moving toward the conversion mechanism between the first blade and the cover member.

According to the configuration above, the sealing member suppresses the cut object from moving toward the conversion mechanism. Further, since the sealing member is engaged with the first blade, the sealing member reciprocates with the first blade along the first direction with respect to the second blade. Thus, the sealing member pushes the cut object in a direction along the first direction. This configuration can suppress the cut object from moving toward the conversion mechanism.

DETAILED DESCRIPTION

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, ail value ranges or indications of groups of entities are intended to disclose every possible intermediate value or intermediate entity for the purpose of original written disclosure, as well as for the purpose of restricting the claimed subject matter.

In one or more embodiments, the sealing member may be configured to reciprocate together with the first blade along the first direction. The cover member may comprise a discharge port. An inlet of the discharge port may be positioned to face the sealing member in the first direction.

According to the configuration above, the cut object is pushed toward the inlet of the discharge port by the reciprocation of the sealing member. This facilitates discharge of the cut object from the working machine.

In one or more embodiments, an outlet of the discharge port may be positioned to face the inlet of the discharge port in the first direction.

According to the configuration above, the cut object, once having entered the discharge port from the inlet of the discharge port, moves to the outlet of the discharge port along the first direction. This facilitates discharge of the cut object from the working machine.

In one or more embodiments, the cover member may comprise a grease guard that is disposed rearward of the discharge port in the front-rear direction and configured to suppress movement of grease.

The grease is applied to the conversion mechanism in order to reduce friction caused by movements. While the conversion mechanism is operating, the grease applied may spatter off from the conversion mechanism. According to the configuration above, the grease spattered from the conversion mechanism is less likely to reach the discharge port owing to the grease guard. Thus, discharge of the grease from the discharge port to the outside of the working machine can be suppressed.

In one or more embodiments, the cover member mas comprise a projecting wall that extends toward the first non-facing surface of the first blade and is disposed forward of the sealing member. The projecting wall may overlap with at least a part of the sealing member as the working machine is viewed in the front-rear direction.

According to the configuration above, the projecting wall blocks at least a part of a space between a second sealing surface of the sealing member and the cover member in the front-rear direction. This can suppress the cut object from crossing over the sealing member and moving toward the conversion mechanism.

Embodiments

Figure 1:
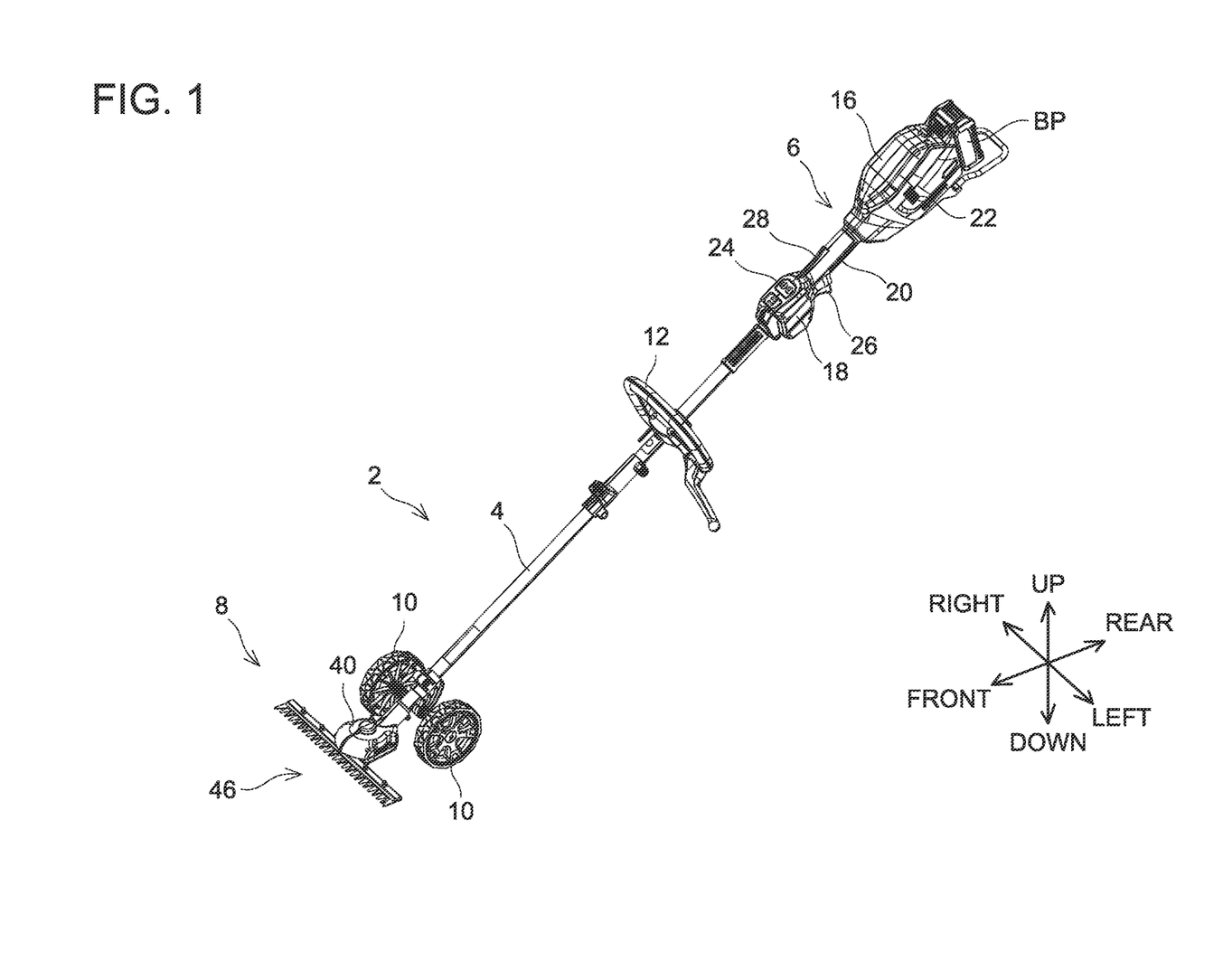
FIG. 1 is a perspective view of a working machine 2 according to an embodiment.

As illustrated in FIG. 1, a working machine 2 according to an embodiment is an electric working machine for gardening, such as a ground trimmer, and is used to cut grass, lawn, etc. on the ground. The working machine 2 comprises an operation rod 4 extending linearly, a rear end unit 6 attached to a longitudinal end of the operation rod 4, a front end unit 8 attached to the other longitudinal end of the operation rod 4, a pair of wheels 10 attached near the other longitudinal end of the operation rod 4, a loop handle 12 attached near a longitudinal center of the operation rod 4, and a battery pack BP. The working machine 2 operates using electric power supplied from the battery pack BP. A user rotates the pair of wheels 10 by pushing the working machine 2 forward while gripping the rear end unit 6 with one hand and the loop handle 12 with the other hand, so that he/she can cut grass, lawn, etc. on the ground while moving the working machine 2 on the ground. Hereinafter, a direction in which the working machine 2 is moved due to the rotation of the pair of wheels 10 will be termed a front-rear direction, a direction perpendicular to the ground will be termed an up-down direction, and a direction perpendicular to both the front-rear direction and the up-down direction will be termed a left-right direction. Further, a direction in which the working machine 2 is moved to cut grass, lawn, etc. on the ground by the working machine 2 (in the present embodiment, a direction in which the working machine 2 is pushed) will be termed a front direction, and the direction opposite to the front direction will be termed a rear direction.

Figure 2:
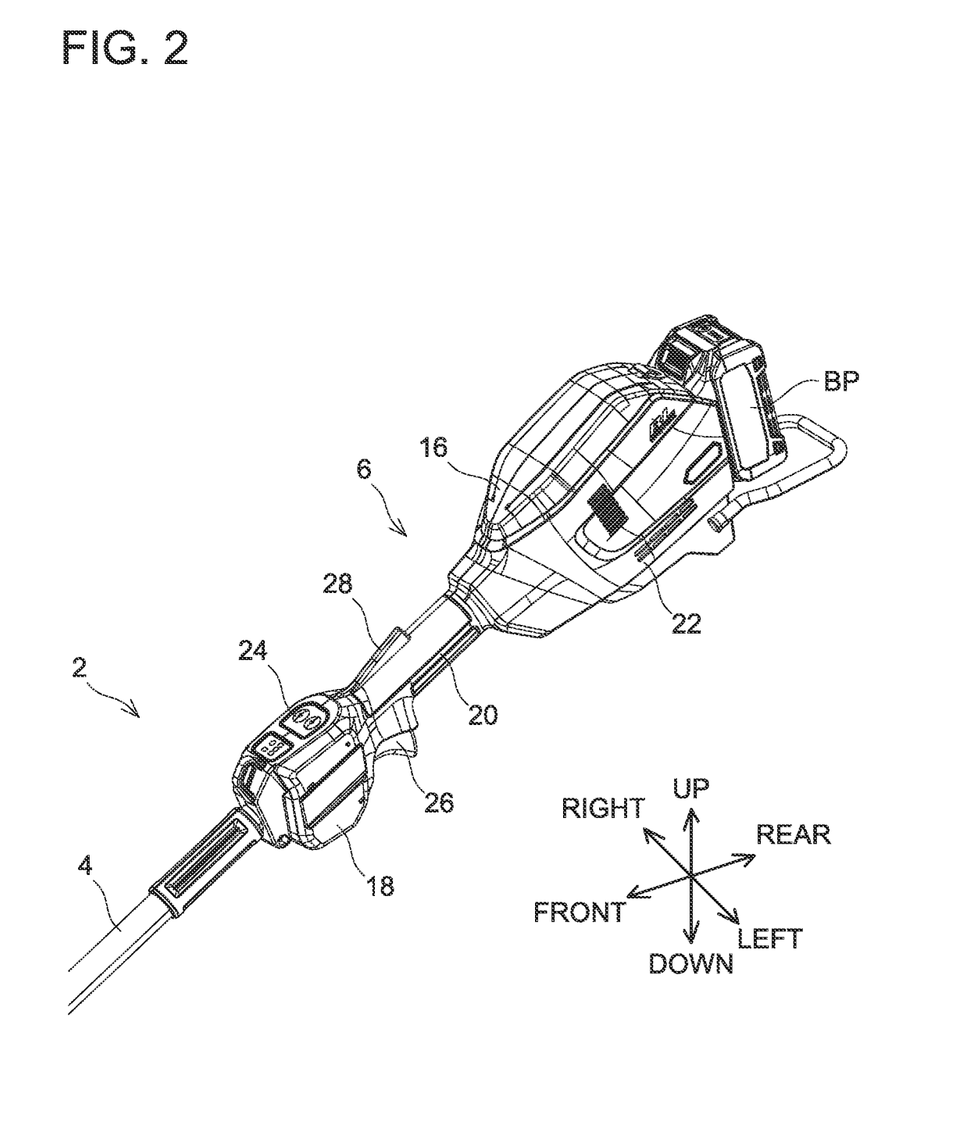
FIG. 2 is a perspective view of the working machine 2 according to the embodiment, in the vicinity of a rear end unit 6.

As illustrated in FIG. 2, the rear end unit 6 comprises a rear end housing 16. The rear end housing 16 comprises a support 18, a grip 20, and a battery attachment part 22.

The operation rod 4 is inserted in the support 18. A main power switch 24 is disposed on an upper surface of the support 18. The main power switch 24 switches the working machine 2 between an on-state and an off-state.

The grip 20 is disposed rearward of the support 18. A trigger 26 is pivotably attached to a lower front portion of the grip 20. The trigger 26 is pushed in with finger(s) of the user gripping the grip 20. When the trigger 26 is pushed in while the working machine 2 is in the on-state, an electric motor 32 (see FIG. 3), which will be described later, operates.

Further, a shark fin 28 is pivotably attached to an upper front portion of the grip 20. The shark fin 28 is pushed in with a palm of the user gripping the grip 20. In the state where the shark fin 28 is pushed in, the user can push in the trigger 26. On the other hand, in the state where the shark fin 28 is not pushed in, the user cannot push in the trigger 26.

The battery attachment part 22 is disposed rearward of the grip 20. The battery pack BP is detachably attached to a rear end of the battery attachment part 22. The battery pack BP can be attached to the battery attachment part 22 by sliding the battery pack BP downward with respect to the battery attachment part 22 along the rear end of the battery attachment part 22. The battery pack BP can be detached from the battery attachment part 22 by sliding the battery pack BP upward with respect to the battery attachment part 22 along the rear end of the battery attachment part 22. Thus, the battery pack BP can be detached from the battery attachment part 22 for charging.

Figure 3:
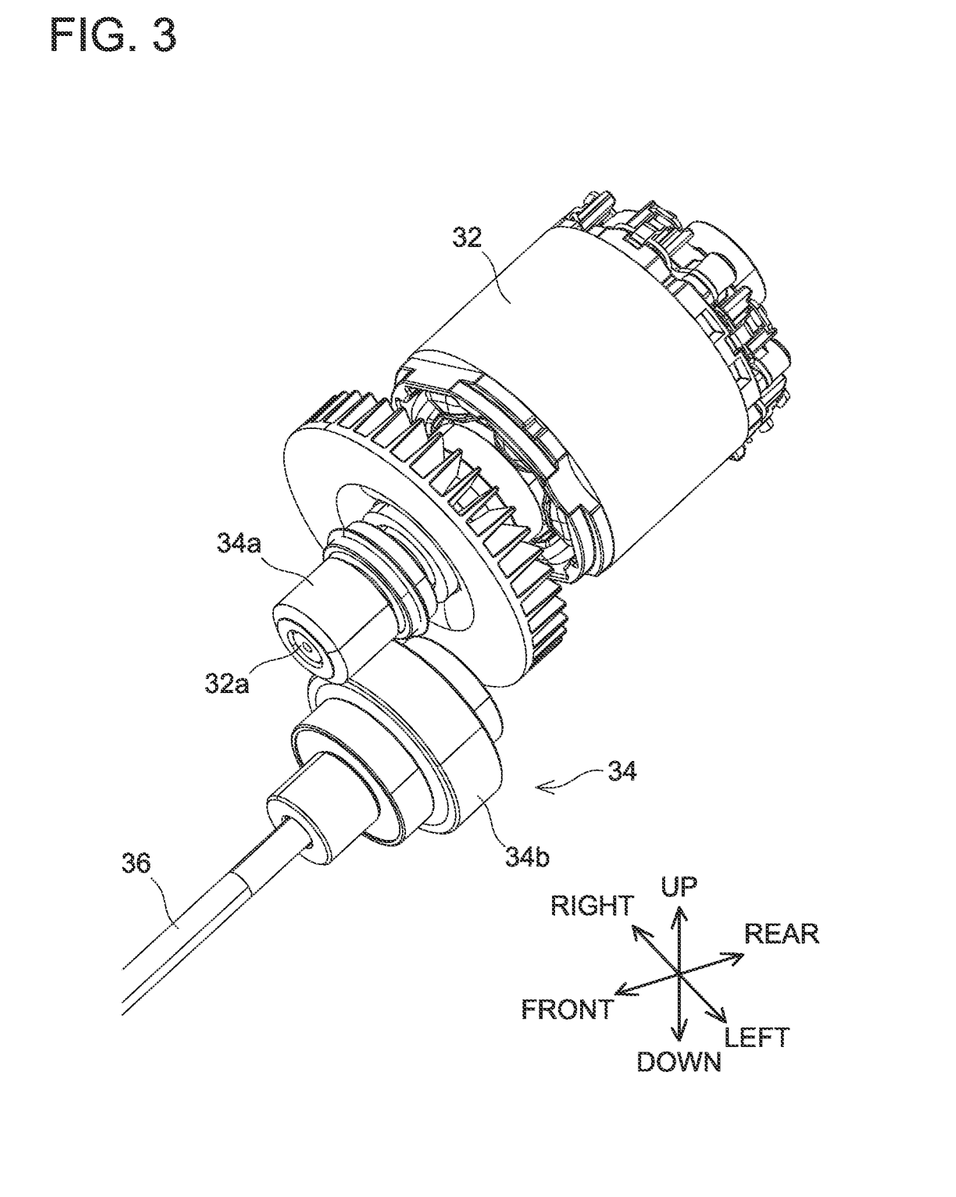
FIG. 3 is a perspective view of an electric motor 32 and a reduction mechanism 34 of the working machine 2 according to the embodiment.

The electric motor 32 and a reduction mechanism 34 as illustrated in FIG. 3 are housed in the battery attachment part 22. The electric motor 32 is an example of prime mover. The electric motor 32 is, for example, a brushless motor. In a variant, the electric motor 32 may be a brushed motor. The electric motor 32 operates using electric power supplied from the battery pack BP (see FIG. 2).

The reduction mechanism 34 comprises a first reduction gear 34a and a second reduction gear 34b. The first reduction gear 34a and the second reduction gear 34b are spur gears. The first reduction gear 34a is coupled to a motor shaft 32a of the electric motor 32. The second reduction gear 34b meshes with the first reduction gear 34a. The number of teeth of the second reduction gear 34b is larger than the number of teeth of the first reduction gear 34a. When the first reduction gear 34a rotates with the rotation of the motor shaft 32a of the electric motor 32, the second reduction gear 34b rotates at a lower rotational speed than that of the first reduction gear 34a.

The second reduction gear 34b is coupled to a transmission shaft 36. The transmission shaft 36 extends from the rear end unit 6 (see FIG. 1) to the front end unit 8 (sec FIG. 1) through the operation rod 4 (sec FIG. 1). The transmission shaft 36 rotates with the rotation of the second reduction gear 34b.

Figure 4:
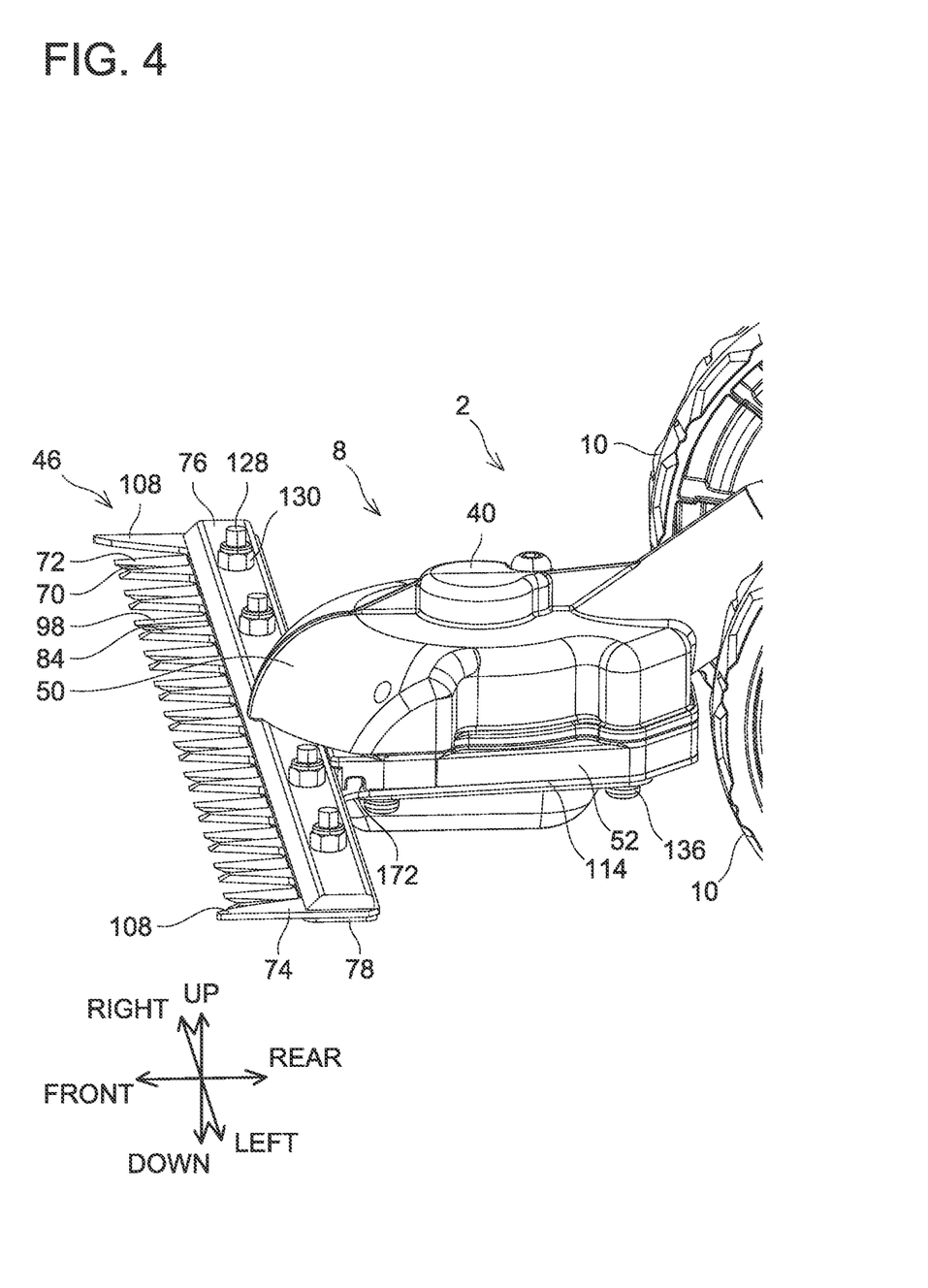
FIG. 4 is a perspective view of the working machine 2 according to the embodiment, in the vicinity of a front end unit 8.

As illustrated in FIG. 4, the front end unit 8 is disposed forward of the pair of wheels 10 and attached to the operation rod 4. The front end unit 8 comprises a front end housing 40, a reduction mechanism 42 (see FIG. 5), a conversion mechanism 44 (see FIG. 5), and a blade unit 46.

Figure 5:
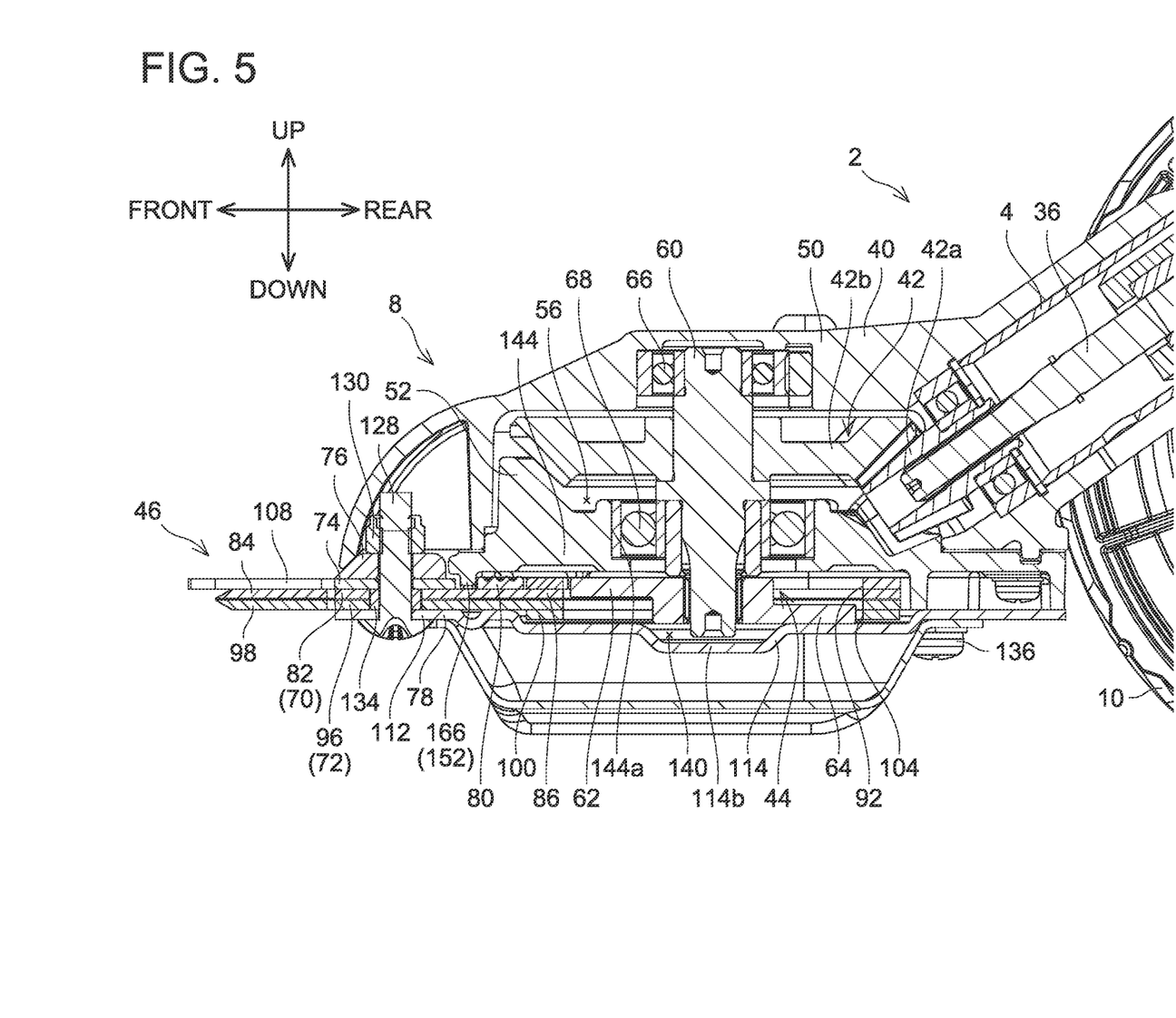
FIG. 5 is a cross sectional view of the working machine 2 according to the embodiment, in the vicinity of the front end unit 8.

As illustrated in FIG. 5, the front end housing 40 comprises a gear housing 50 and a cover member 52. The gear housing 50 is coupled to a front end of the operation rod 4 with a screw (not illustrated). The cover member 52 closes a lower end opening of the gear housing 50. Thus, a gear accommodating chamber 56 is defined between the gear housing 50 and the cover member 52.

The reduction mechanism 42 is disposed in the gear accommodating chamber 56. The reduction mechanism 42 comprises a third reduction gear 42a and a fourth reduction gear 42b. The third reduction gear 42a and the fourth reduction gear 42b are bevel gears. The third reduction gear 42a is coupled to a front end of the transmission shaft 36. The fourth reduction gear 42b meshes with the third reduction gear 42a. The number of teeth of the fourth reduction gear 42b is larger than the number of teeth of the third reduction gear 42a. When the third reduction gear 42a rotates with the rotation of the transmission shaft 36, the fourth reduction gear 42b rotates at a lower rotational speed than that of the third reduction gear 42a. The fourth reduction gear 42b rotates about a rotation axis along the up-down direction.

The conversion mechanism 44 is a cam-crank conversion mechanism. The conversion mechanism 44 comprises a crank shaft 60, an upper disk 62, and a lower disk 64. The crank shaft 60 is rotatably supported by the gear housing 50 and the cover member 52 via bearings 66, 68. The crank shaft 60 is coupled to the fourth reduction gear 42b. Further, the crank shaft 60 extends through the cover member 52, and a lower end of the crank shaft 60 is disposed outside of the gear accommodating chamber 56.

The upper disk 62 and the lower disk 64 are coupled to the lower end of the crank shaft 60. The upper disk 62 and the lower disk 64 each have a circular disk shape. The upper disk 62 and the lower disk 64 rotate with the rotation of the crank shaft 60. A rotation center of the upper disk 62 is offset from the center of circular disk shape of the upper disk 62, and a rotation center of the lower disk 64 is offset from the center of circular disk shape of the lower disk 64. When the upper disk 62 rotates forward, the lower disk 64 rotates rearward, whereas when the upper disk 62 rotates rearward, the lower disk 64 rotates forward. A grease is applied to the upper disk 62 and the lower disk 64 to reduce friction between the upper disk 62 and the lower disk 64.

Figure 6:
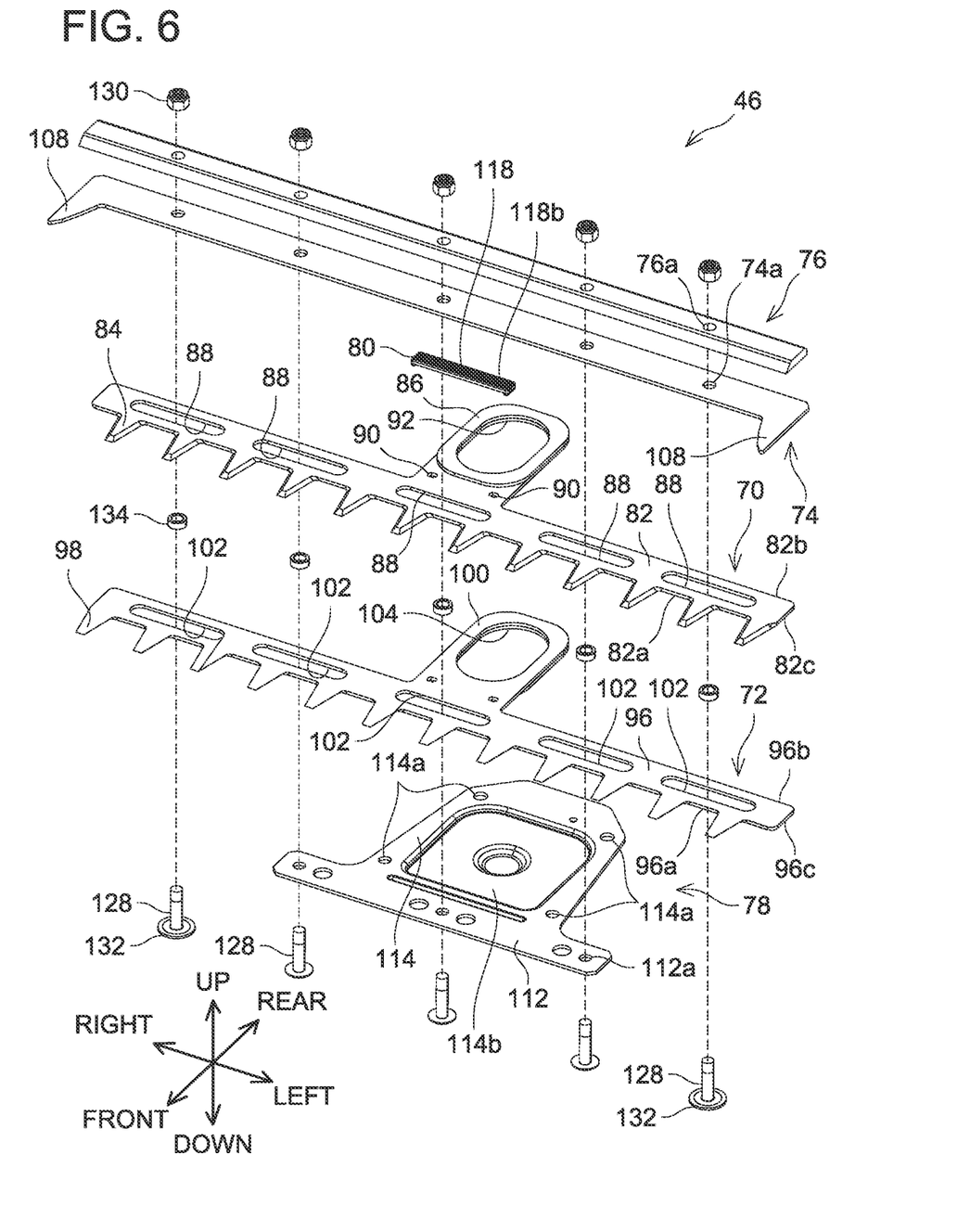
FIG. 6 is an exploded perspective view of a blade unit 46 of the working machine 2 according to the embodiment.

Referring to FIG. 6, the blade unit 46 will be described. The blade unit 46 according to the present embodiment can cut grass, lawn, etc. on the ground. The blade unit 46 comprises a first blade 70, a second blade 72, an intermediate plate 74, a first guide member 76, a second guide member 78, and a sealing member 80.

The first blade 70 comprises a first blade body 82, a plurality of first blade edges 84, and a first crank plate 86. The first blade body 82 extends in the left-right direction. The first blade body 82 includes a plurality of first elongated holes 88 having a longitudinal direction along the left-right direction. The first elongated holes 88 extend through the first blade body 82 in a thickness direction (in the up down direction). The first blade edges 84 project forward from a front surface 82a of the first blade body 82 extending along the left-right direction. The first blade edges 84 are arranged along the left-right direction. The first, crank plate 86 is disposed at a rear portion of the first blade, body 82, near the center of the first blade body 82 in the left-right direction. The first crank plate 86 includes a plurality of engagement holes 90 (two engagement holes 90 in the present embodiment) and a first crank opening 92 disposed rearward of the plurality of engagement holes 90. The two engagement holes 90 extend through the first crank plate 86 in the up-down direction. The two engagement holes 90 are arranged along the left-right direction. The first crank opening 92 extends through the first crank plate 86 in the up-down direction.

As illustrated in FIG. 6, the second blade 72 overlaps with the first blade 70 in the up-down direction such that the second blade 72 is positioned below the first blade 70. The second blade 72 has a shape that matches the shape of the first blade 70. The second blade 72 comprises a second blade body 96, a plurality of second blade edges 98, and a second crank plate 100. The second blade body 96 extends in the left-right direction. In the state where the second blade body 96 overlaps with the first blade body 82, a front surface 96a of the second blade body 96 is aligned with the front surface 82a of the first blade body 82 in the up-down direction, a rear surface 96b of the second blade body 96 is aligned with a rear surface 82b of the first blade body 82 in the up-down direction, and an upper surface 96c of the second blade body 96 faces a lower surface 82c of the first blade body 82. The second blade body 96 includes a plurality of second elongated holes 102 having a longitudinal direction along the left-right direction. The second elongated holes 102 extend through the second blade body 96 in a thickness direction (in the up-down direction). The second blade edges 98 project forward from the front surface 96a of the second blade body 96 extending in the left-right direction. The second blade edges 98 are arranged along the left-right direction. The second crank plate 100 is disposed at a rear portion of the second blade body 96, near the center of the second blade body 96 in the left-right direction. The second crank plate 100 includes a second crank opening 104 extending through the second crank plate 100 in the up-down direction.

As illustrated in FIG. 6, the intermediate plate 74 overlaps with the first blade 70 in the up-down direction such that the intermediate plate 74 is positioned above the first blade 70. The intermediate plate 74 is disposed opposite to the second blade 72 with respect to the first blade 70. The intermediate plate 74 extends in the left-right direction. Projections 108 extending forward are disposed at both ends of the intermediate plate 74, respectively. The intermediate plate 74 closes the plurality of first elongated holes 88 of the first blade body 82 from above. The intermediate plate 74 includes a plurality of intermediate screw holes 74a extending through the intermediate plate 74 in a thickness direction (in the up-down direction). The intermediate screw holes 74a are arranged along the left-right direction.

The first guide member 76 overlaps with the intermediate plate 74 in the up-down direction such that the first guide member 76 is positioned above the intermediate plate 74. The first guide member 76 is disposed opposite to the first blade 70 with respect to the intermediate plate 74. The first guide member 76 extends in the left-right direction. The first guide member 76 includes a plurality of first screw holes 76a extending through the first guide member 76 in a thickness direction (in the up-down direction). The first screw holes 76a are arranged along the left-right direction.

The second guide member 78 overlaps with the second blade 72 in the up-down direction such that the second guide member 78 is positioned below the second blade 72. The second guide member 78 is disposed opposite to the first blade 70 with respect to the second blade 72. The second guide member 78 comprises a second guide member body 112 and a cover member 114. The second guide member body 112 extends in the left-right direction. The second guide member body 112 closes the plurality of second elongated holes 102 of the second blade body 96 from below. The second guide member body 112 includes a plurality of second front screw holes 112a extending through the second guide member body 112 in a thickness direction (in the up-down direction). The second front screw holes 112a are arranged along the left-right direction. The cover member 114 is disposed at a rear portion of the second guide member body 112, near the center of the second guide member body 112 in the left-right direction. The cover member 114 includes a plurality of second rear screw holes 114a extending through the cover member 114 in a thickness direction (in the up-down direction) and a recess 114b recessed downward from an upper surface of the cover member 114.

Figure 7:
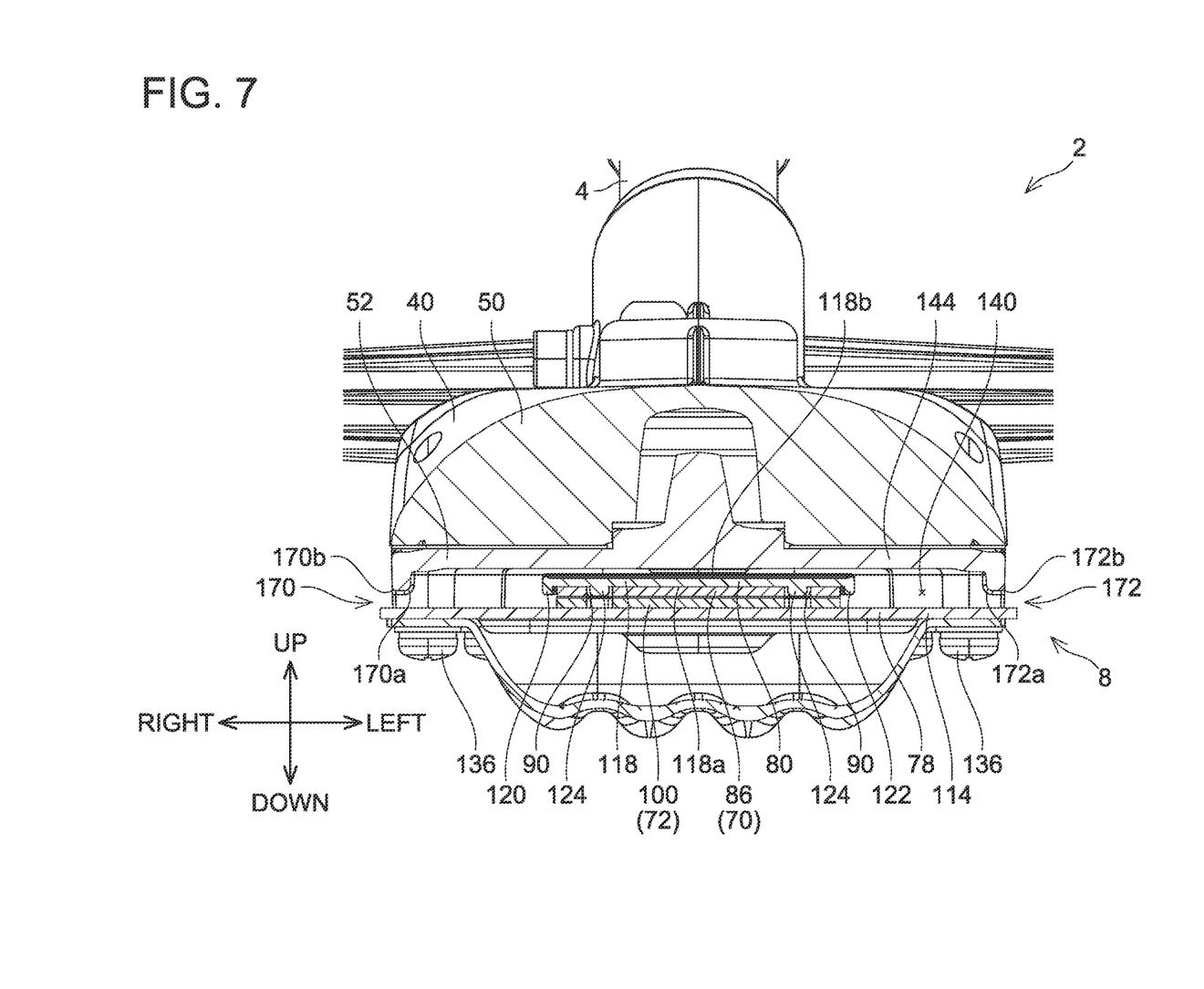
FIG. 7 is a front cross-sectional view of the working machine 2 according to the embodiment, in the vicinity of the blade unit 46.

The sealing member 80 is engaged with an upper surface of the first crank plate 86, near the connection of the first blade body 82 to the first crank plate 86. The sealing member 80 is disposed closer to the first blade body 82 than a step region of the first crank plate 86 is. The upper surface of the first crank plate 86 constitutes a part of an upper surface of the first blade 70. Further, the sealing member 80 is disposed rearward of the first blade edges 84 and the second blade edges 98. As illustrated in FIG. 7, the sealing member 80 comprises a seating member body 118, a right wall 120, a left wall 122, and a plurality of engagement projections 124 (two engagement projections 124 in the present embodiment). The sealing member body 118 extends in the left-right direction. A lower surface 118a of the sealing member body 118 faces the upper surface of the first crank plate 86. The lower surface 118a of the sealing member body 118 constitutes a lower surface of the sealing member 80. A width of the sealing member body 118 in the left-right direction is larger than a width of the first crank plate 86 in the left-right direction. The right wall 120 extends downward from a right end of the sealing member body 118. The left wall 122 extends downward from a left end of the sealing member body 118. The first crank plate 86 is held between the right wall 120 and the left wall 122. This suppresses the sealing member 80 from moving in the left-right direction with respect to the first blade 70. The two engagement projections 124 extend downward from the lower surface 118a of the sealing member body 118. The two engagement projections 124 are disposed between the right wall 120 and the left wall 122 in the left-right direction. Each engagement projection 124 is inserted in corresponding one of the engagement holes 90 of the first crank plate 86. This suppresses the sealing member 80 from moving in the front-rear direction and the left-right direction with respect to the first blade 70.

As illustrated in FIG. 6, the first blade 70, the second blade 72, the intermediate plate 74, the first guide member 76, and the second guide member 78 are fixed with screws 128 and nuts 130. The screws 128 are inserted in the second front screw holes 112a of the second guide member 78, the first elongated holes 88 of the first blade 70, the second elongated holes 102 of the second blade 72, the intermediate screw holes 74a of the intermediate plate 74, and the first screw holes 76a of the first guide member 76. The nuts 130 receive the screws 128 above the first guide member 76. For the leftmost screw 128 and the rightmost screw 128, washers 132 are interposed between the screw heads of these screws 128 and the second guide member 78. Further, annular sleeves 134 are disposed in the first elongated holes 88 of the first blade 70 and the second elongated holes 102 of the second blade 72. The screws 128 are inserted in the sleeves 134. The sleeves 134 guide the reciprocation of the first blade 70 and the second blade 72 in the left-right direction.

Further, as illustrated in FIG. 5, in the state where the first blade 70, the second blade 72, the intermediate plate 74, the first guide member 76, and the second guide member 78 are assembled together, the second guide member 78 is fixed to a lower portion of the cover member 52 by screws 136 being inserted in the second rear screw holes 114a (see FIG. 6). Thus, a crank chamber 140 is defined between the cover member 52 and the recess 114b of the second guide member 78. The upper disk 62 and the lower disk 64 of the conversion mechanism 44, the first crank plate 86 of the first blade 70, and the second crank plate 100 of the second blade 72 are disposed in the crank chamber 140.

When the second guide member 78 is fixed to the lower portion of the cover member 52 in the state where the first blade 70, the second blade 72, the intermediate plate 74, the first guide member 76, and the second guide member 78 are assembled together, the upper disk 62 is disposed in the first crank opening 92 of the first crank plate 86 and the lower disk 64 is disposed in the second crank opening 104 of the second crank plate 100. By the upper disk 62 rotating while contacting an inner surface of the first crank opening 92, the first blade 70 reciprocates in the left-right direction with respect to the front end housing 40. By the lower disk 64 rotating while contacting an inner surface of the second crank opening 104, the second blade 72 reciprocates in the left-right direction with respect to the front end housing 40. Further, when the second blade 72 moves leftward, the first blade 70 moves rightward, whereas when the second blade 72 moves rightward, the first blade 70 moves leftward.

Figure 8:
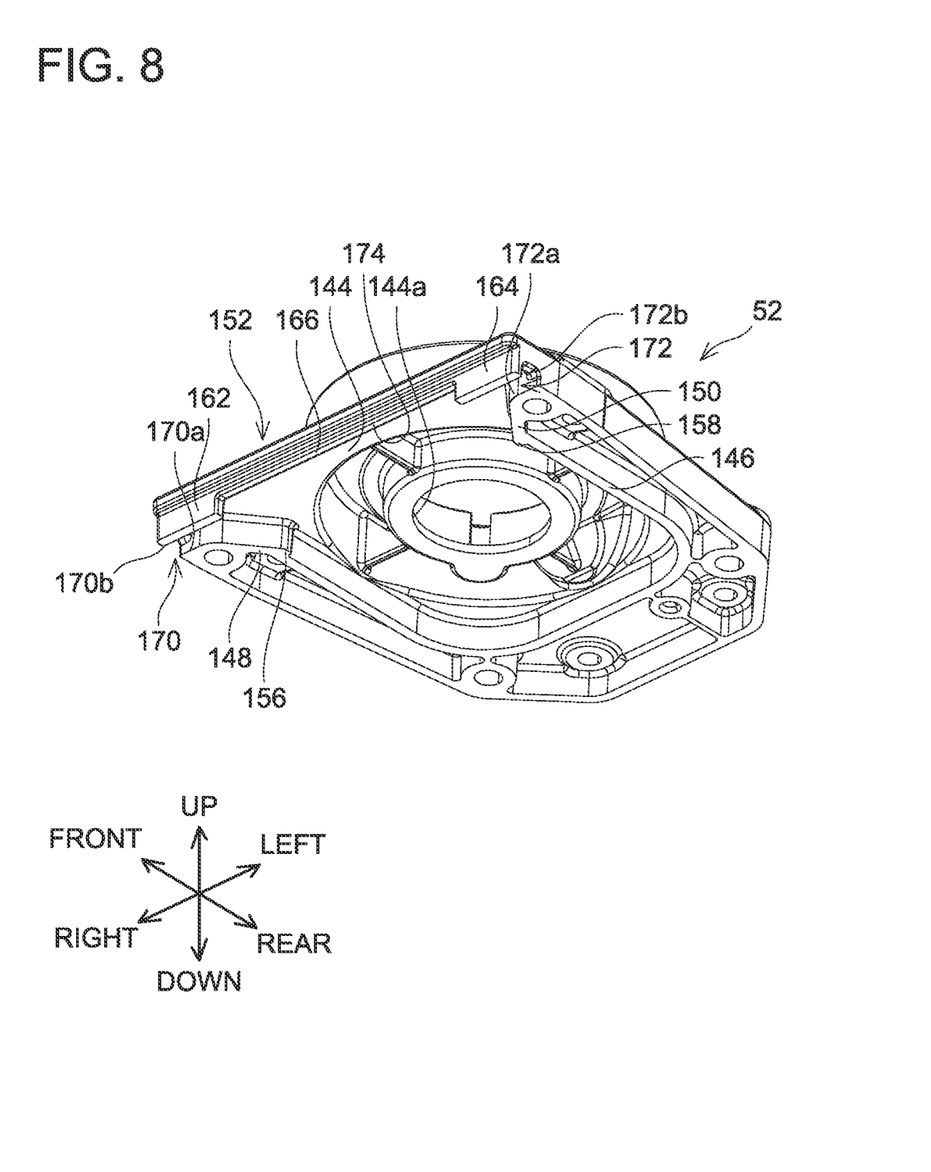
FIG. 8 is a perspective view of a cover member 52 of the working machine 2 according to the embodiment.

Referring to FIG. 8, the structure of the cover member 52 defining the crank chamber 140 will be described in detail. The cover member 52 comprises an upper wall 144, a U-shaped wall 146, aright inclined wall 148, a left inclined wall 150, and a front wall 152. The upper wall 144 defines the gear accommodating chamber 56 (see FIG. 5) between the gear housing 50 (see FIG. 5) and the upper wall 144. The upper wall 144 includes an upper opening 144a in which the crank shaft 60 (see FIG. 5) is inserted.

The U-shaped wall 146, the right inclined wall 148, the left inclined wall 150, and the front wall 152 are disposed below the upper wall 144. The U-shaped wall 146 has a substantially U-shape as the cover member 52 is viewed from below. The U-shaped wall 146 is open forward.

The right inclined wall 148 extends forward and rightward from a right front end of the U-shaped wall 146, and then bends and extends rightward. A right grease guard 156 is defined near the connection of the right inclined wall 148 to the right front end of the U-shaped wall 146. The right grease guard 156 projects leftward from an inner surface of the right front end of the U-shaped wall 146.

The left inclined wall 150 extends forward and leftward from a left front end of the U-shaped wall 146, and then bends and extends leftward. A left grease guard 158 is defined near the connection of the left inclined wall 150 to the left front end of the U-shaped wall 146. The left grease guard 158 projects rightward from an inner surface of the left front end of the U-shaped wall 146.

Figure 9:
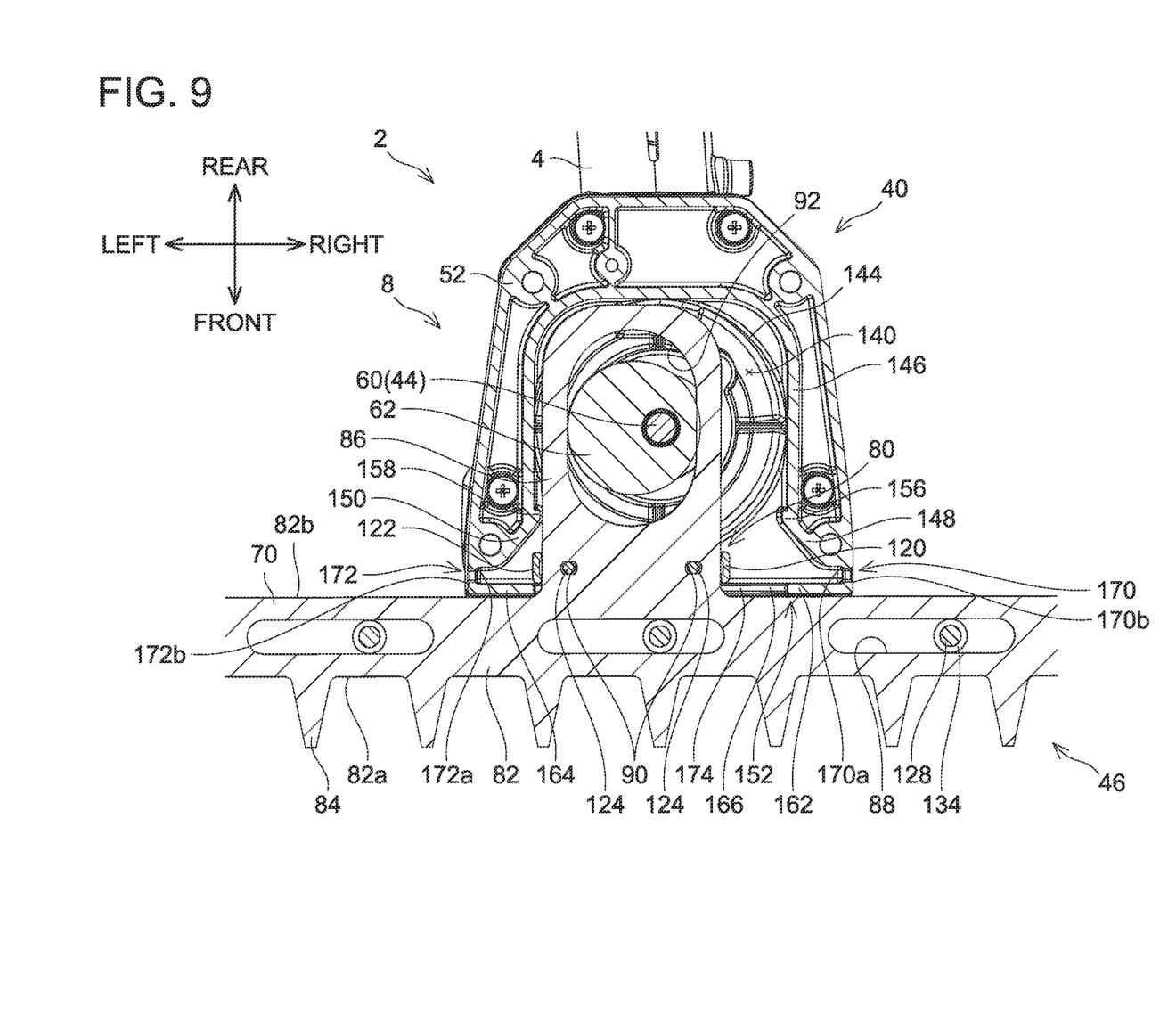
FIG. 9 is an upper cross-sectional view of the working machine 2 according to the embodiment, in the vicinity of the blade unit 46.

The front wall 152 extends in the left-right direction at a front end of the upper wall 144. The front wall 152 comprises a right projecting wall 162, a left projecting wall 164, and a central projecting wall 166. The right projecting wall 162 is disposed forward of the right inclined wall 148. The right projecting wall 162 is offset forward from the right inclined wall 148. Thereby, a right discharge port 170 is defined between the right projecting wall 162 and the right inclined wall 148. The right discharge port 170 communicates the crank chamber 140 with a space outside of the working machine 2. In the left-right direction, an inlet. 170*a* of the right discharge port 170 faces an outlet 170*b* of the right discharge port 170. As illustrated in FIG. 9, a width of the right discharge port 170 in the front-rear direction is smaller than a width of the sealing member 80 in the front-rear direction.

As illustrated in FIG. 8, the left projecting wall 164 is disposed forward of the left inclined wall 150. The left projecting wall 164 is offset forward from the left inclined wall 150. Thereby, a left discharge port 172 is defined between the left projecting wall 164 and the left inclined wall 150. The left discharge port 172 communicates the crank, chamber 140 with the space outside of the working machine 2. In the left-right direction, an inlet 172*a* of the left discharge port 172 faces an outlet 172*b* of the left discharge port 172. As illustrated in FIG. 9, a width of the left discharge port 172 in the front-rear direction is smaller than the width of the sealing member 80 in the front-rear direction.

As illustrated in FIG. 8, the central projecting wall 166 is disposed between the right projecting wall 162 and the left projecting wall 164. A length of the central projecting wall 166 in the up-down direction is smaller than both of a length of the right projecting wall 162 in the up-down direction and a length of the left projecting wall 164 in the up-down direction. Thereby, a front end opening 174 is defined between the right projecting wall 162 and the left projecting wall 164 and below the central projecting wall 166.

Figure 10:
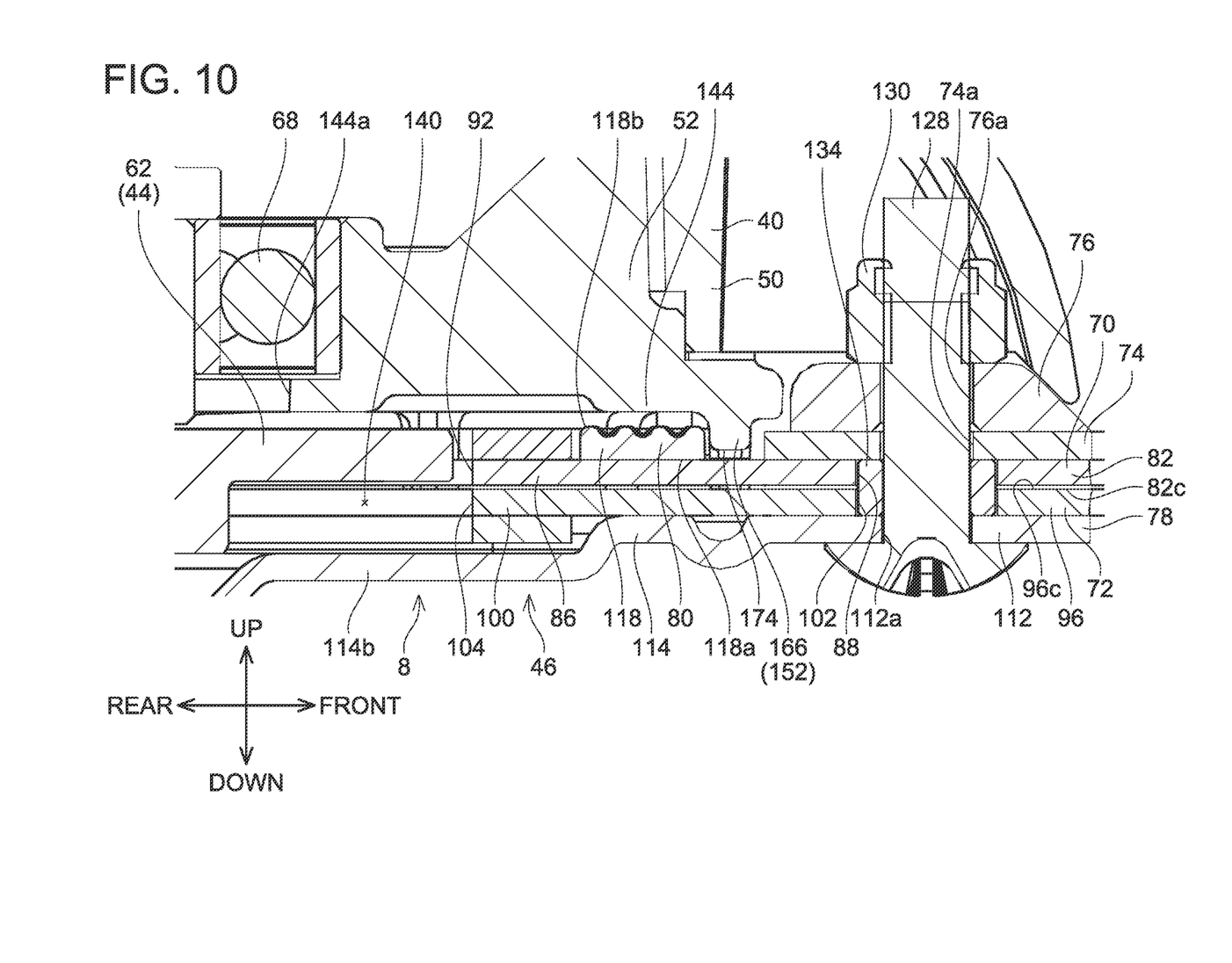
FIG. 10 is a vertical cross-sectional view of the working, machine 2 according to the embodiment, in the vicinity of the blade unit 46.

Next, a positional relationship between the cover member 52 and the blade unit 46 will be described. In the state where the blade unit 46 is attached to the cover member 52 as illustrated in FIG. 9, the first crank plate 86 of the first blade 70 and the second crank plate 100 of the second blade 72 (see FIG. 6) are inserted in the front end opening 174 of the cover member 52. The sealing member 80 is disposed rearward of the front end opening 174. Further, the sealing member 80 is disposed forward of the upper disk 62 and the lower disk 64 (see FIG. 5) in the crank chamber 140 (i.e., forward of the conversion mechanism 44). Moreover, in the left-right direction, the sealing member 80 faces both of the inlet 170*a* of the right discharge port 170 and the inlet 172*a* of the left discharge port 172. As illustrated in FIG. 10, the sealing member 80 is disposed rearward of the central projecting wall 166. As the blade unit 46 is viewed in the front-rear direction, at least a part of the sealing member 80 overlaps with the central projecting wall 166. The sealing member 80 and the central projecting wall 166 define a labyrinth structure. An upper surface 118*b* of the sealing member body 118 faces the upper wall 144 of the cover member 52. The upper surface 118*b* of the sealing member body 118 constitutes an upper surface of the sealing member 80. The upper surface 118*b* of the sealing member body 118 is spaced from the upper wall 144. The central projecting wall 166 extends toward the upper surface of the first crank plate 86. In the front-rear direction, the central projecting wall 166 is disposed between the sealing member 80 and the intermediate plate 74. As the blade unit 46 is viewed in the front-rear direction, at least a part of the central projecting wall 166 overlaps with the intermediate plate 74.

Next, how the first blade 70 and the second blade 72 cut an object such as grass, lawn, etc. will be described. As described above, when the electric motor 32 operates, the motion of the electric motor 32 is transmitted to the first blade 70 and the second blade 72 via the transmission shaft 36 (see FIG. 3) and the conversion mechanism 44 (see FIG. 5), and the first blade 70 and the second blade 72 reciprocate in the left-right direction with respect to the front end housing 40. When the working machine 2 is pushed forward, an object to be cut enters bet ween the first blade edges 84 of the first blade 70 and the second blade edges 98 of the second blade 72 and is cut thereby.

The cut object can move rearward between the first blade 70 and the intermediate plate 74 due to the reciprocation of the first blade 70 in the left-right direction. Once having crossed over the intermediate plate 74, the cut object moves toward the central projecting wall 166 of the cover member 52. The labyrinth structure defined by the sealing member 80 and the central projecting wall 166 prevents the cut object from moving in a space between the upper surface 118*b* of the sealing member body 118 and the cover member 52. Thus, the cut object is suppressed from moving toward the conversion mechanism 44.

Due to the reciprocation of the first blade 70 in the left-right direction, as illustrated in FIG. 9, the cut object, whose rearward movement has been suppressed by the sealing member 80, is pushed rightward by the right wall 120 of the sealing member 80. Then, the cut object enters the right discharge port 170 through the inlet 170*a* of the right discharge port 170. The cut object then moves rightward in the right discharge port 170 and is discharged from the outlet 170*b* of the right discharge port 170 to the outside of the crank chamber 140.

The cut object, whose rearward movement has been suppressed by the sealing member 80, may be pushed leftward by the left wall 122 of the sealing member 80. Then, the cut object enters the left discharge port 172 through the inlet 172*a* of the left discharge port 172. The cut object then moves leftward in the left discharge port 172 and is discharged from the outlet 172*b* of the left discharge port 172 to the outside of the crank chamber 140.

When the cut object is discharged to the outside of the crank chamber 140, the upper disk 62 and the lower disk 64 of the conversion mechanism 44 (see FIG. 5) are in operation. Thus, a part of the grease applied on the upper disk 62 and the lower disk 64 can spatter off from the upper disk 62 and the lower disk 64. The spattering grease moves forward along the U-shaped wall 146 in the crank chamber 140. The grease, which has reached the front ends of the U-shaped wall 146, is blocked by the right grease guard 156 and the left grease guard 158, and thus cannot move forward beyond the right grease guard 156 and the left grease guard 158. Therefore, the grease is less likely to be discharged to the outside of the crank chamber 140 through the right discharge port 170 and the left discharge port 172.

Effects

The working machine 2 comprises the electric motor 32; the conversion mechanism 44 configured to convert the motion of the electric motor 32; the first blade 70 connected to the conversion mechanism 44; the second blade 72 overlapping with the first blade 70 in the up-down direction and facing the lower surface of the first blade 70; the sealing member 80 engaged with the upper surface of the first blade 70 that is opposite to the lower surface of the first blade 70, wherein the sealing member 80 comprises the lower surface facing the upper surface of the first blade 70 in the up-down direction; and the cover member 52 facing the upper surface of the sealing member 80 that is opposite to the lower surface of the sealing member 80. The first blade 70 comprises first blade edges 84. The second blade 72 comprises second blade edges 98. The first blade 70 is configured to reciprocate along the left-right direction with respect to the second blade 72 by the motion of the electric motor 32. The first blade edges 84 of the first blade 70 and the second blade edges 98 of the second blade 72 are configured to cut an object when the working machine 2 is moved forward along the front-rear direction, which is perpendicular to the up-down direction, with the first blade 70 reciprocating with respect to the second blade 72. The sealing member 80 is disposed forward of the conversion mechanism 44 and configured to suppress the object cut with the first blade edges 84 of the first blade 70 and the second blade edges 98 of the second blade 72 from moving toward the conversion mechanism 44 between the first blade 70 and the cover member 52.

According to the configuration above, the sealing member 80 suppresses the cut object from moving toward the conversion mechanism 44. Further, since the sealing member 80 is engaged with the first blade 70, the sealing member 80 reciprocates with the first blade 70 along the left-right direction with respect to the second blade 72. Thus, the sealing member 80 pushes the cut object in a direction along the left-right direction. This configuration can suppress the cut object from moving toward the conversion mechanism 44.

The sealing member 80 is configured to reciprocate together with the first blade 70 along the left-right direction. The cover member 52 comprises the discharge ports 170, 172. The inlets 170a, 172a of the discharge ports 170, 172 are positioned to face the sealing member 80 in the left-right direction.

According to the configuration above, the cut object is pushed toward the inlets 170a, 172a of the discharge ports 170, 172 by the reciprocation of the sealing member 80. This facilitates discharge of the cut object from the working machine 2.

The outlets 170b, 172b of the discharge ports 170, 172 are positioned to face the inlets 170a, 172a of the discharge ports 170, 172 in the left-right direction.

According to the configuration above, the cut object, once having entered the discharge ports 170, 172 from the inlets 170a, 172a of the discharge ports 170, 172, moves to the outlets 170b, 172b of the discharge ports 170, 172 along the left-right direction. This facilitates discharge of the cut object from the working machine 2.

The cover member 52 comprises the grease guards 156, 158 that are disposed rearward of the discharge ports 170, 172 in the front-rear direction and configured to suppress movement of the grease.

The grease is applied to the conversion mechanism 44 in order to reduce friction caused by movements. While the conversion mechanism 44 is operating, the grease applied may spatter off from the conversion mechanism 44. According to the configuration above, the spattering grease from the conversion mechanism 44 is less likely to reach the discharge ports 170, 172 owing to the grease guards 156, 158. Thus, discharge of the grease from the discharge ports 170, 172 to the outside of the working machine 2 can be suppressed.

The cover member 52 comprises the central projecting wall 166 that extends toward the upper surface of the first blade 70 and is disposed forward of the sealing member 80. The central projecting wall 166 overlaps with at least a pan of the sealing member 80 as the working machine 2 is viewed in the front-rear direction.

According to the configuration above, the central projecting wall 166 blocks at last a part of the space between the upper surface of the sealing member 80 and the cover member 52 in the front-rear direction. This can suppress the cut object from crossing over the sealing member 80 and moving toward the conversion mechanism 44.

Corresponding Relationships

The lower surface of the first blade 70 is an example of "first facing surface". The upper surface of the first blade 70 is an example of "first non-facing surface". The lower surface of the sealing member 80 is an example of "first sealing surface". The upper surface of the sealing member 80 is an example of "second sealing surface". The left-right direction is an example of "first direction". The central projecting wall 166 is an example of "projecting wall".

Variants

In an embodiment, the working machine 2 may be a lawn trimmer.

In an embodiment, the working machine 2 may not comprise the battery pack BP and may operate using electric power supplied from an external power source via an external cable.

In an embodiment, the working machine 2 may not comprise the pair of wheels 10.

In an embodiment, the working machine 2 may comprise an engine instead of the electric motor 32.

In an embodiment, the blade unit 46 may comprise a sealing member engaged with the lower surface of the second blade 72. In this case, this sealing member is disposed between the second blade 72 and the second guide member 78. According to this configuration, the cut object is suppressed from moving toward the conversion mechanism 44 from between the second blade 72 and the second guide member 78.

In an embodiment, the width of the right discharge port 170 in the front-rear direction may be larger than the width of the sealing member 80 in the front-rear direction. Further, the width of the left discharge port 172 in the front-rear direction may be larger than the width of the sealing member 80 in the front-rear direction.

In an embodiment, the first blade 70 may further comprise blade edges on the rear surface 82b of the first blade body 82. Further, the second blade 72 may further comprise blade edges on the rear surface 96b of the second blade body 96.

In an embodiment, the first blade 70 and the second blade 72 may reciprocate linearly (along the left-right direction in the embodiment) or reciprocate in an arc manner. In the case where the first blade 70 and the second blade 72 reciprocate in an arc manner, the first blade 70 and the second blade 72 reciprocate such that they rotate about a rotation axis extending along the up-down direction. That is, the first direction is along a circumferential direction of the rotation axis.

In the embodiment above, an object is cut with the first blade edges 84 of the first blade 70 and the second blade edges 98 of the second blade 72 when the working machine 2 is pushed forward. In an embodiment, an object may be cut with the first blade edges 84 of the first blade 70 and the second blade edges 98 of the second blade 72 when the user pulls the working machine 2 toward himself/herself. In this case, the direction in which the working machine is pulled corresponds to the front direction. Further, the first blade edges 84 (the second blade edges 98), the central projecting wall 166, the sealing member 80, and the conversion mechanism 44 are arranged in this order from the front toward the rear (i.e., in a direction away from the user). Moreover, when the user uses the working machine 2, the first blade edges 84 and the second blade edges 98 are oriented toward the user. According to this configuration, an object cut with the first blade edges 84 and the second blade edges 98 is suppressed from moving toward the conversion mechanism by the central projecting wall 166 and the sealing member 80.

What is claimed is:

1. A working machine comprising:
a prime mover;
a conversion mechanism configured to convert motion of the prime mover;
a first blade connected to the conversion mechanism;
a second blade overlapping with the first blade in an up-down direction and facing a first facing surface of the first blade;
a sealing member in direct contact with a first non-facing surface of the first blade that is opposite to the first facing surface of the first blade, wherein the sealing member comprises a first sealing surface facing the first non-facing surface of the first blade in the up-down direction; and
a cover member facing a second sealing surface of the sealing member that is opposite to the first sealing surface of the sealing member,
wherein
the first blade comprises a first blade edge,
the second blade comprises a second blade edge,
the first blade is configured to reciprocate along a first direction with respect to the second blade by the motion of the prime mover,
the first blade edge of the first blade and the second blade edge of the second blade are configured to cut an object when the working machine moves forward along a front-rear direction, which is perpendicular to the up-down direction, with the first blade reciprocating with respect to the second blade,
the sealing member is disposed forward of the conversion mechanism and configured to suppress the object cut with the first blade edge of the first blade and the second blade edge of the second blade from moving toward the conversion mechanism between the first blade and the cover member,
the sealing member is configured to reciprocate together with the first blade along the first direction,
the cover member defines a mechanism chamber in which at least a part of the conversion mechanism is disposed,
the cover member comprises a discharge port communicating the mechanism chamber with a space outside of the working machine, and
an inlet of the discharge port is positioned to face the sealing member in the first direction.

2. The working machine according to claim 1, wherein an outlet of the discharge port is positioned to face the inlet of the discharge port in the first direction.

3. The working machine according to claim 1, wherein the cover member comprises a grease guard that is disposed rearward of the discharge port in the front-rear direction and configured to suppress movement of grease.

4. The working machine according to claim 1, wherein
the cover member comprises a projecting wall that extends toward the first non-facing surface of the first blade and is disposed forward of the sealing member, and
the projecting wall overlaps with at least a part of the sealing member as the working machine is viewed in the front-rear direction.

5. The working machine according to claim 2, wherein the cover member comprises:
a grease guard that is disposed rearward of the discharge port in the front-rear direction and configured to suppress movement of a grease; and
a projecting wall that extends toward the first non-facing surface of the first blade and is disposed forward of the sealing member, and
the projecting wall overlaps with at least a part of the sealing member as the working machine is viewed in the front-rear direction.

* * * * *